United States Patent [19]
Thomas

[11] Patent Number: 4,492,978
[45] Date of Patent: Jan. 8, 1985

[54] TRANSMISSION SYSTEM FOR TV SIGNALS

[75] Inventor: Leslie D. Thomas, Baltimore, Md.

[73] Assignee: Westinghouse Electric Corp., Pittsburgh, Pa.

[21] Appl. No.: 19,987

[22] Filed: Mar. 12, 1979

[51] Int. Cl.³ .............................................. H04N 7/12
[52] U.S. Cl. ...................................... 358/134; 370/75; 455/7; 455/39
[58] Field of Search ............... 358/133, 134, 137, 138, 358/141; 325/3, 9; 455/7, 39, 17, 20, 39, 49; 370/75

[56] References Cited

U.S. PATENT DOCUMENTS

| | | | |
|---|---|---|---|
| 2,860,186 | 11/1958 | Hefele | 179/15 |
| 3,487,310 | 12/1969 | Bateman et al. | 325/9 |
| 3,488,435 | 1/1970 | Eilenberger | 358/133 |
| 3,522,372 | 7/1970 | Adkisson et al. | 358/133 |
| 3,663,749 | 5/1972 | Cannon | 358/133 |
| 3,697,682 | 10/1972 | Berg | 358/133 |
| 3,745,242 | 7/1973 | Justice | 358/135 |
| 3,781,463 | 12/1973 | Van den Bussche | 179/15.55 T |
| 3,792,194 | 2/1974 | Wood et al. | 179/2 TV |
| 3,857,999 | 12/1974 | Justice | 358/140 |
| 3,941,919 | 3/1976 | Baker | 358/12 |
| 3,953,666 | 4/1976 | Justice | 358/12 |
| 3,982,063 | 9/1976 | Brown et al. | 358/133 |
| 4,025,950 | 5/1977 | Matsumoto et al. | 358/133 |
| 4,158,861 | 6/1979 | Iizuka | 358/261 |

Primary Examiner—John C. Martin
Assistant Examiner—Edward L. Coles
Attorney, Agent, or Firm—J. B. Hinson

[57] ABSTRACT

A system for reducing the bandwidth and simultaneously transmitting a plurality of signals through a common transponder. The system is particularly useful for the transmissions of multiple TV signals via a geostationary satellite. Prior to transmission the bandwidth of each of the signals to be transmitted is reduced by one half by deleting every other line and expanding each of the remaining lines to cover a time interval normally occupied by two lines. After transmission through the satellite, each of lines is recorded at a first rate and read back at a higher rate to reduce the time interval of each line to its original value. Each line is repeated twice to reconstruct a TV signal having the same format at the original signal.

9 Claims, 6 Drawing Figures

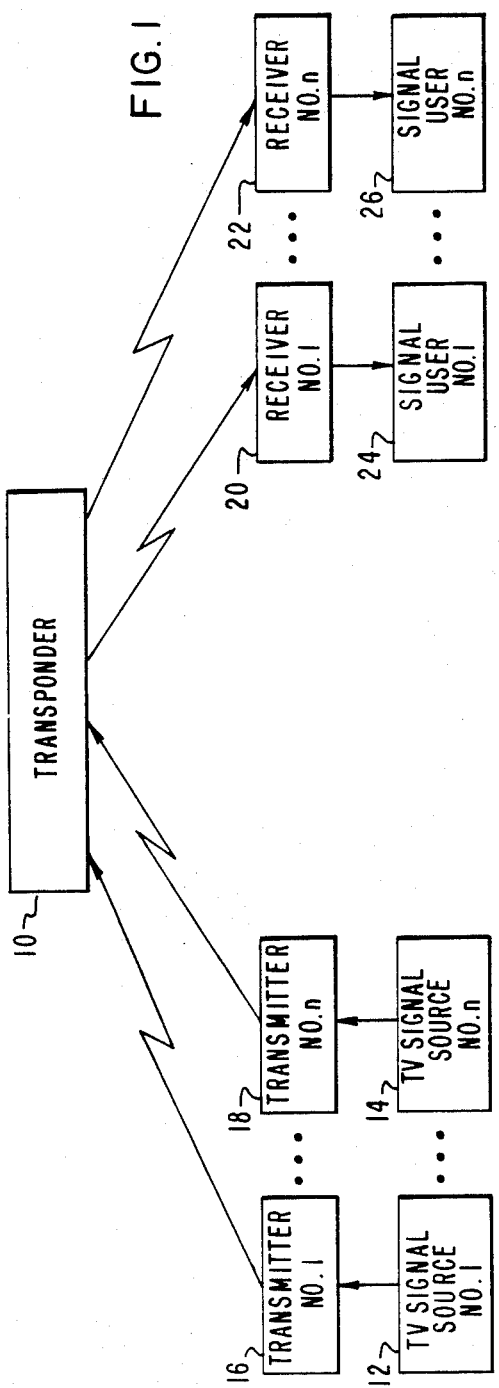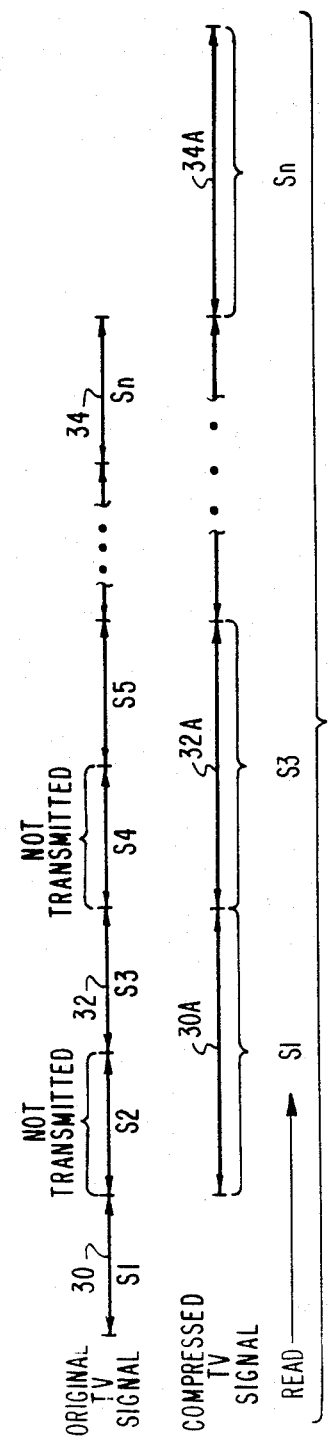

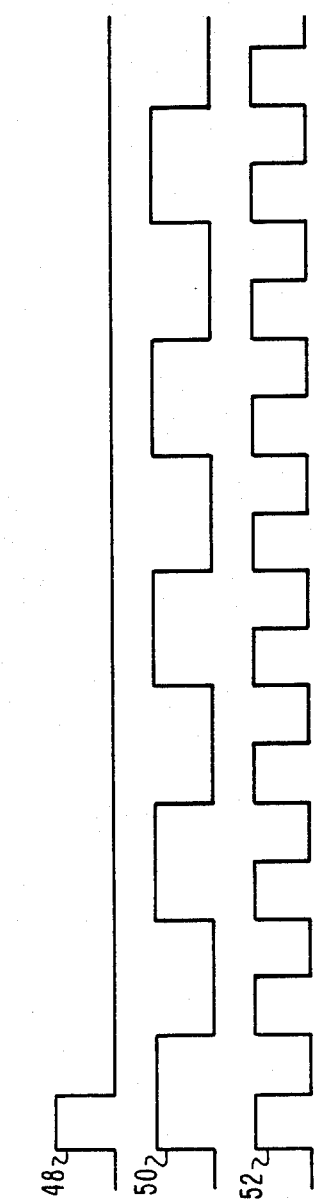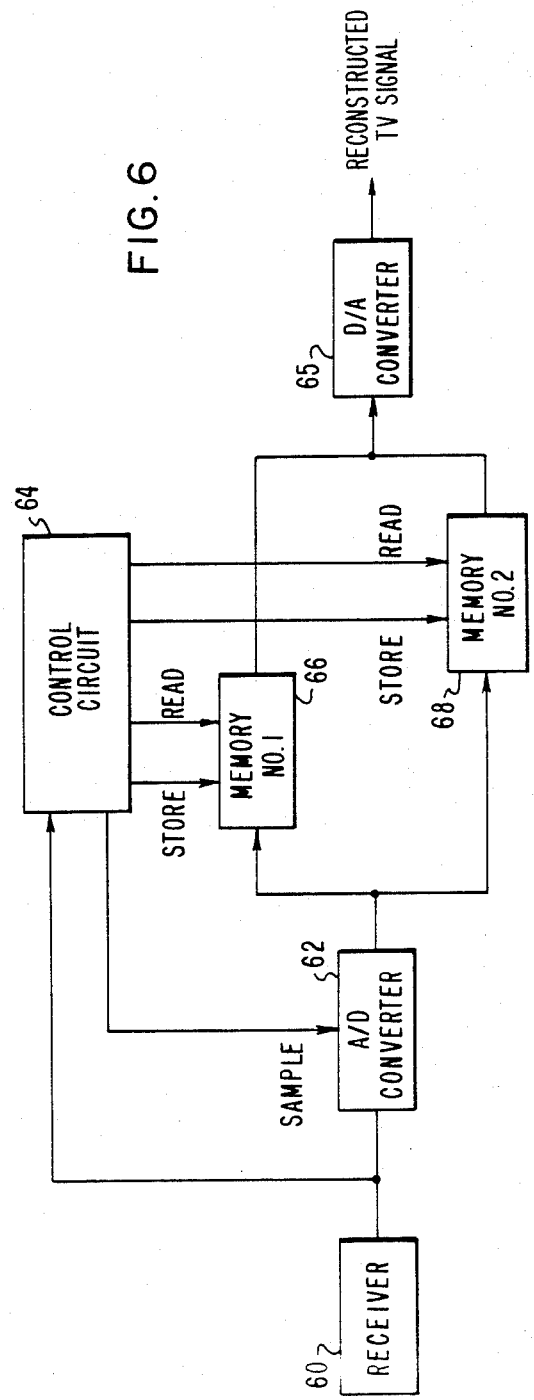

TRANSMISSION SYSTEM FOR TV SIGNALS

BACKGROUND OF THE INVENTION

1. Field of the Invention

The invention relates to communications systems and more particularly a system for transmitting and receiving multiple TV signals through a common transponder.

2. Description of the Prior Art

Typical transponders, geostationary satellites for example, have limited bandwidth and power capabilities. The number of TV signals which can be simultaneously transmitted via a transponder can be increased if the bandwidth of the individual TV signals can be reduced.

Prior art systems for transmitting a plurality of TV signals through a common transponder included apparatus to delete selected lines of each of the signals and time-multiplex the remaining lines such that the lines of the signals did not overlap. This technique permitted a plurality of TV signals to be transmitted through a common transponder using the same bandwidth as one of the original signals. However, these systems required that the signals be synchronized so that no two signals would be simultaneously transmitted. This was necessary because if the signals overlapped the bandwidth or the transponder could be exceeded during a time interval corresponding to the overlap. The required synchronization was difficult to achieve if two or more of the signals being transmitted originated at different geographical locations.

SUMMARY OF THE INVENTION

The preferred embodiment of the invention comprises a system for transmitting and receiving a plurality of TV signals via a common transponder. The system includes a plurality (two in the preferred embodiment) of transmitting and receiving stations, each transmitting station having circuit means for selectively deleting lines of a TV signal to be transmitted and means for expanding the remaining lines to cover the entire time interval of the original signal to produce a compressed TV signal having a bandwidth less than the bandwidth of the original TV signal. Each transmitting station also includes transmitting means coupled to receive the compressed signal to produce a first carrier modulated with the compressed signal. A transponder responsive to the first carrier produces a second carrier which is also modulated with the compressed signal. Each receiving station includes receiving means tuned to the second carrier and demodulating means for producing an output signal comprising the compressed signal. Each of the receiving stations also includes signal processing circuits to process the compressed signal to produce a reconstructed TV signal having the same number of lines and bandwidth as the original TV signal.

DESCRIPTION OF THE DRAWINGS

FIG. 1 is a functional block diagram illustrating the preferred embodiment of this invention;

FIG. 2 is a time sequence diagram illustrating the relationship between a conventional TV signal and the compressed TV signal;

FIG. 5 is a waveform diagram illustrating typical clock signals utilized by the system;

FIG. 6 is a block diagram of the circuitry used to generate the reconstructed TV signal.

DETAILED DESCRIPTION

Figure 3:
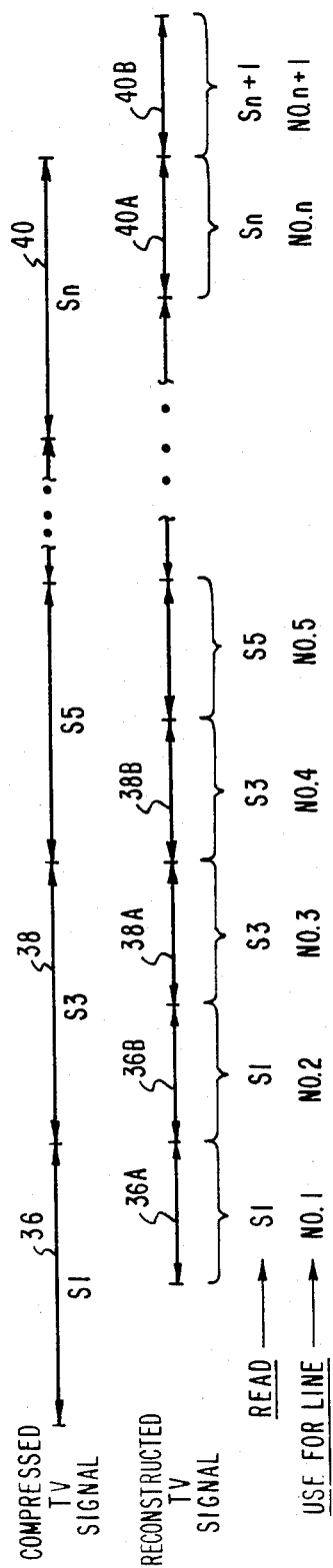
FIG. 3 is a time sequence diagram illustrating the relationship between the compressed TV signal and the reconstructed TV signal.

FIG. 1 is a functional block diagram of the system comprising the preferred embodiment of the invention. Television signals to be transmitted through a transponder 10 are generated by a plurality of signal sources with the 1st and Nth signal source, respectively, illustrated at Reference 12, 14. In the preferred embodiment only two signal sources are used. These signal sources are typically TV stations which generate TV signals in the standard TV format.

In the preferred embodiment, a standard TV signal from the first signal source 12 is coupled to a first transmitting station 16. Similarly, the TV signal from the Nth signal source 14 is coupled to an Nth transmitting station 18. The number of signal sources and transmitting stations which can be utilized is dependent upon the bandwidth of the transponder 10 and the degree of signal compression utilized. In the preferred embodiment, only two signals are transmitted and alternate lines of each TV signal to be transmitted are deleted for purposes of signal compression. Compression is accomplished by digitizing the lines to be transmitted in real time and storing the resulting digital numbers. The stored digital numbers are lead at one half the storage rate and coupled to a digital to analog converter to generate the compressed TV signal. (Compression, for purposes of this patent application, is a process for reducing the bandwidth of a TV signal by deleting selected lines of the TV signal and expanding in time the remaining lines.)

In the preferred embodiment, the transponder 10 is a geostationary satellite. The TV signals from the transmitting stations 16, 18 are typically transmitted via a modulated microwave carrier from the transmitting station to the transponder 10. In the preferred embodiment, each of the TV signals are transmitted on a separate carrier. The carriers have slightly different frequencies, with the carriers and their important sidebands, generated when the carrier is modulated by the compressed TV signal, being within the bandwidth of the transponder 10.

The modulated microwave signals arriving at the transponder 10 from the transmitting stations 16, 18 are amplified and retransmitted to receiving stations. The transponder 10 may retransmit the arriving signals on the same carrier frequency. Alternatively, the transponder 10 may include frequency translation circuitry for retransmitting the arriving signals on a different carrier frequency. For example, the signal (modulated first carrier) transmitted from the first transmitting station 16 will be amplified and retransmitted (via a second modulated carrier) by the transponder 10. Similarly, the signal from the Nth transmitting station 18 will be amplified and retransmitted. A first receiver 20 is tuned to the second carrier frequency. Similarly, a second receiver 22 is tuned to the carrier frequency used to transmit the signal from the Nth signal source 14.

As previously discussed, the signals from the TV signal sources 12, 14 are compressed prior to transmission. At the receiving stations 10, 20, the compressed signals are processed to generate a reconstructed TV signal having the same number of line and bandwidth as the original signal. Specifically, each of the lines comprising the compressed TV signal arriving at the receiver storing are digitized and the digital numbers are stored in real time. The stored digital numbers are read at twice the storage rate and converted to an analog signal to generate a line of the reconstructed TV signal. The reconstructed lines thus formed comprise the reconstructed TV signals which are utilized by signal users 24, 26 in a conventional manner.

FIG. 2 is a time chart illustrating a typical TV signal such as the signal generated by each of the signal sources 12 and 14 and a typical compressed TV signal transmitted by transmitting stations 12 and 14 to the transponder 10. The sequential lines of the typical TV signal are labeled S1 through SN. In compressing the typical TV signal, the system comprising the preferred embodiment of the invention deletes every even line of the typical TV signal; e.g., lines S2, S4, S6 . . . SN (N=an even integer), and stretches each of the odd lines; e.g., line S1, S3, S5 . . . SN (N=an odd integer), to cover a time interval corresponding to the two immediately subsequent lines of the typical TV signal. For example, the first line of the typical TV signal (S1) is identified by the Reference 30. This line is stretched to cover the time interval corresponding to the second and third lines, (S2) and (S3) of the typical TV signal as indicated at reference numeral 30A. Similarly, the third line (S3) of the typical TV signal is identified by reference 32. This line is stretched to cover the time interval corresponding to the fourth and fifth lines, (S4) and (S5), of the typical TV signal as indicated at reference 32a. This process is continuously repeated for the entire time interval during which the typical TV signal is transmitted. Thus, it can be seen that the amount of video information transmitted has been reduced by one half as a result of deleting every other line of the typical TV signal. This results in the compressed TV signal having a bandwidth of one half the bandwidth of the typical TV signal. This permits more individual TV signals (TV images) to be transmitted via a transponder of fixed bandwidth without exceeding the bandwidth of the transponder. Additionally, each of the compressed TV signals are continuously transmitted thereby eliminating any requirement that the TV signals to be transmitted be synchronized with each other.

In the above example the bandwidth of the TV signal was reduced to one half of its original value by deleting alternate lines of the TV signal and stretching each of the remaining lines to occupy a time interval equal to two lines of the original signal. A further reduction can be achieved by deleting additional lines. Deleting lines reduces the quality of the image with the quality of the image being the limiting factor on the number of lines which may be deleted. Little noticeable degradation of the image is introduced by deleting alternate lines.

FIG. 3 is a time diagram illustrating the reception of a typical compressed TV signal. As noted previously, only the odd lines of the typical TV signal are transmitted. Thus, in FIG. 3 the lines of the compressed signal are identified as S1, S3, S5, S7, through SN (where SN is an odd integer). This corresponds to the notation used in FIG. 2.

At the receiving station, each line of the compressed signal is processed to generate two lines of the reconstructed TV signal. The time interval of each line of the reconstructed TV signal is equal to one half of the time interval of the corresponding line of the compressed signal. For example, the first line of the compressed signal, illustrated at reference numeral 36, is processed to generate two identical lines, which are used as the first and second lines of the reconstructed TV signal. The first and second lines of the reconstructed TV image are illustrated at reference numerals 36A and 36B. The remaining lines of the compressed signal are similarly processed with the last line (SN) of the compressed signal and the corresponding lines of the reconstructed TV signal being respectively illustrated at reference numerals 40, 40A and 40B.

Figure 4:
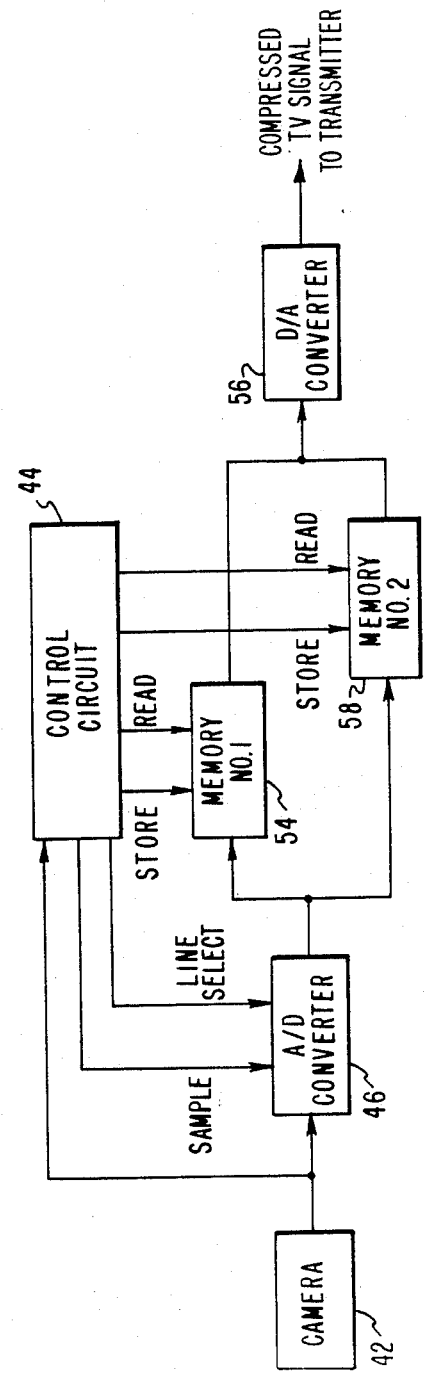
FIG. 4 is a block diagram of the circuitry used for compressing the TV signals.

FIG. 4 is a block diagram of the circuitry used to compress each of the TV signals prior to transmission. This circuitry will be explained with reference to the TV signal generated by a TV camera 42. The video signal from the TV camera 42 is coupled to control circuitry 44. The control circuitry 44 detects the horizontal and vertical synchronizing pulses of the TV signal to generate signals controlling the remainder of the compression circuitry.

The video signal from the camera 42 is also coupled as an input signal to an analog-to-digital converter 46. Immediately following detection of the horizontal synchronizing pulse 48 (FIG. 5) the control logic 44 initiates the generation of a low frequency clock signal 50 and a high frequency clock signal 52. The horizontal synchronizing pulse 48 is typical in that it is representative of the horizontal synchronizing pulse which preceeds each line of the typical TV signal as well as each line of the compressed TV signal. The high frequency clock signal 52 has twice the frequency of the low frequency clock signal 50 with both of these clock signals synchronized to the horizontal synchronizing signal 48. The high and low frequency clock signals, 50 and 52, are also typical clock signals. Typical is used in the sense these clock signals are representative of the clock signals utilized at the transmitting and the receiving stations.

The period of the high and low frequency clock signals, 50 and 52, may be any convenient time interval. In standard TV signals, it has been found to be sufficient to sample each line of the TV signal and the compressed TV signal in the range of three hundred times. Since it is convenient to sample the TV signal each clock pulse, it is convenient to select the period of the low frequency clock signal 50 to produce three hundred cycles during each line of the TV signal. At the receiver, the period of the low frequency clock signal is selected to produce three hundred cycles for each line of the compressed TV signal. It should also be noted that there is no requirement that the clock signals used at the transmitting and receiving stations be synchronized with respect to each other.

At the typical transmitter 16, the high frequency clock signal 52 is used to control the analog-to-digital converter 46 to sample the video signal from the camera 42 to generate digital numbers representative of the amplitude of the video signal at the sample time. These digital numbers may contain any convenient number of bits, six bits for example. These digital numbers are stored in either first memory 54 or in a second memory 58. For example, on the detection of the horizontal sync pulse of the first line (S1) illustrated in FIG. 2, the control logic 44 initiates sampling of the TV signal by the analog-to-digital converter 46. During this line, for example, 300 samples of the TV signal is taken, and the digital number representative of these samples are stored in the first memory 54. In sampling the TV signal, no distinction is made between the synchronization and video portion of each line comprising the TV signal. That is, the synchronizing pulses are processed in the same manner as the video. On the detection of the horizontal sync signal associated with the second line S2 illustrated in FIG. 3, the control logic begins reading the data words stored in the first memory 54 at a rate one-half that of a sample rate under the control of the read clock signal 50 (FIG. 5). Since the reading is at one half the sample rate of all the storage cycle, it requires two line intervals before all of the samples related to the first video line (S1) are read from the first memory 54. As these words are read, they are coupled to a digital-to-analog converter 56 to generate at the output of this converter the compressed TV signal. When the sync pulse associated with the third line (S3), illustrated at reference numeral 32 is detected by the control logic 44 sampling of the TV signal is again initiated and 300 samples are sequentially stored in a second memory 58. This storage cycle extends throughout the entire time interval of the third line of the TV signal. When storage of the samples of the third line (S3) is complete and the sync pulse associated with the four line (S4) is detected, reading of the samples stored in the second memory 58 is initiated to produce the second word, of the compressed TV signal, illustrated at reference numeral 32A. Detection of the horizontal sync pulse associated with the fifth word (S5) of the TV signal reinitiates storage of data in the first memory 54. The above cycle is repeated until the complete TV signal to be transmitted is compressed and transmitted. The last line (SN) of the TV signal is illustrated at reference numeral 34. The last line by the compressed signal is similarly illustrated at reference numeral 34A.

FIG. 6 is a block diagram of the circuit for processing the compressed TV signal to generate a reconstructed TV signal which can be utilized by a standard TV apparatus. Each of the receiving stations includes circuitry of this type.

The carrier modulated with the compressed TV signal from the transponder 10 is detected by a receiver 60. Receiver 60, for example, is tuned to the frequency of the carrier which is modulated with the compressed TV signal from the first signal source 12 (FIG. 1). This carrier is demodulated to recover the compressed TV signal. When the horizontal synchronizing pulse associated with the first line of the compressed TV signal is detected by the control circuitry 64 an analog-to-digital converter 62 is initiated to sample the compressed TV signal. The sample rate is determined by the high frequency clock signal 52 of FIG. 5. The clock signal is selected such that during the each line interval of the compressed signal; e.g., the first line interval S1, the compressed video signal is sampled 300 times. The digital numbers resulting from these samples are stored in the first memory 66. At approximately the middle of the first line interval, reading of the stored samples at twice the storage rate is initiated by the control circuitry 64. These digital words are coupled to a digital-to-analog converter 65 to generate at the output of the digital-to-analog converter 65 the reconstructed TV signal. During the last half of the time interval defined by the first line of the compressed TV signal, all of the samples stored in the memory will have been used. This information generates the first line of the reconstructed TV signal as illustrated in FIG. 3 at reference numeral 36A.

At the beginning of the second line 38 (FIG. 3) of the compressed TV signal, the control circuit 64 initiates sampling of the compressed TV signal and stores the samples in a second memory 68. During the first half of the interval defined by the second line of the compressed video signal, all of the information stored in the first memory is read a second time and used as the second line of the reconstructed TV signal as illustrated at reference numeral 36B. At the middle of the time interval of the second line of the compressed TV signal, illustrated at reference numeral 38, the control logic 44 initiates the reading of the samples stored in the second memory 58. All of the stored digital words are completely read by the end of the time interval defined by the second line (S3) of the compressed TV signal. These digital words are coupled to the input of the digital-to-analog converter 65 to generate the third line (S3) of the reconstructed TV signal, as illustrated at reference numeral 38A. After all of the data stored in the second memory 64 has been read the first time, it is repeated and used as the fourth line of the reconstructed TV image as illustrated at reference numeral 38B. When the sync pulse associated with the third line (Sc) of the compressed TV image is detected, the sampling and storing of the signal in the first memory 66 is initiated for a second time. The cycle described above is continuously repeated until the transmission ends. The last line of the compressed TV signal is illustrated at reference numeral 40. Similarly, the last two lines of the reconstructed TV signal are illustrated at reference numerals 40A and 40B.

The reconstructed signal available at the output of the digital-to-analog converter 65 is compatible with all standard TV applications. Some vertical resolution may be lost due to the deletion of every other line of the TV signal for purposes of compression. If this is a problem in a particular application, resolution can be improved by averaging between adjacent lines to generate video to fill the lines not transmitted instead of simply repeating lines, as described above.

Each of the users of the transponder has a receiver and transmitter signal signal of the type described above. Therefore, the functional description and circuitry, described above, with reference to one signal, is descriptive of each signal. In the system described above, every other line of the TV image was deleted; therefore, the bandwidth of the signal transmitted was reduced to one-half of its original value. This increases the number of individual signals that can be handled by a single transponder without increasing the bandwidth by two. If a further increase in the number of signals which can be handled is desired, the bandwidth of each of the signals can be further reduced by transmitting only every third line, for example. However, as the number of lines deleted increases the quality of the reconstructed image will inevitably decrease.

It should also be noted that in the system described above, the signal from each user is continuous and there is no requirement that synchronization between the various users be maintained. The various signal sources and receiving stations may be at different geographical locations. The only limitation is that the transmitting and receiving stations be within view of the transponder antenna. It is also important that the transmission time to and from the transponder change at a relatively slow rate. If the transmission time varies too rapidly, line-to-line and frame-to-frame, synchronization may become difficult.

Although the system comprising the invention has been described above with reference to the transmission of TV signals, it is obvious that the system is useful for transmitting other signals comprising multiple lines which include synchronization signals; a typical example of such a signal is facsimile.

The system described above can be implemented using well-known techniques and commercially available components.

What is claimed is:

1. A system for simultaneously transmitting and simultaneously receiving a plurality of signals via a common transponder comprising:

(1) a plurality of transmitting stations, each including:
   (a) means for sampling a signal to be transmitted at a predetermined sampling rate to generate a plurality of digital data words, each of said data words being indicative of the magnitude of the sampled signal;
   (b) memory means for storing said plurality of digital words;
   (c) memory read means for reading said stored digital data words at a rate less than said sampling rate to produce a data stream comprising said digital data words at the output of said memory means;
   (d) circuit means responsive to said data stream to produce a compressed signal having a bandwidth less than the bandwidth of the original signal;
   (e) transmitting means for producing a respective first carrier modulated by said compressed signal;
   (f) a transponder responsive to said respective first carrier to produce a respective second carrier modulated with said compressed signal;

(2) a plurality of receiving stations, each including:
   (a) a receiving means tuned to said respective second carrier, said receiving means also including demodulating means for recovering said compressed signal from said respective second carrier, said compressed signal being available at the output terminal of said receiving means;
   (b) digital sampling means for sampling said compressed signal at a preselected rate to produce a plurality of digital data words;
   (c) memory means for storing said plurality of digital data words;
   (d) memory read means for reading said stored digital data words at a rate higher than said preselected rate to produce a data stream comprising a plurality of digital words; and
   (e) circuit means responsive to said data stream to produce a reconstructed signal having the same bandwidth as said signal to be transmitted.

2. A system for simultaneously transmitting a plurality of TV signals via a common transponder, comprising:

(1) a plurality of transmitting stations each including:
   (a) means for selectively deleting lines of a TV signal to be transmitted and for expanding the remaining lines to cover the time interval of the original signal to produce a compressed TV signal comprising fewer lines then said TV signal to be transmitted;
   (b) transmitting means responsive to said compressed signal to produce a respective first carrier modulated with said compressed TV signal;
   (2) transponder means responsive to said respective first carrier to produce a respective second carrier modulated with said compressed signal;
(3) a plurality of receiving stations, each including:
   (a) receiving means tuned to said respective second carrier and demodulation means for recovering said compressed signal from said respective second carrier to produce an output signal comprising said compressed signal;
   (b) circuit means for processing said compressed signal to produce a reconstructed TV signal having the same number of lines as said signal to be transmitted.

3. A system for transmitting a plurality of TV signals via a common transponder in accordance with claim 2 wherein: said means for selectively deleting lines by said TV signal includes
   (a) circuit means for selecting alternate lines of said TV signals;
   (b) circuit means for sampling at a first rate the selected alternate lines of said TV signal and for generating a plurality of digital data words, each of said digital data words having a value indicative of the amplitude of said TV signal at the corresponding sampling time;
   (c) means for reading said digital data words at a second rate, said second rate being lower than said second sampling rate to produce a data stream comprising said stored digital data words; and
   (d) digital to analog conversion circuit means responsive to said data stream to produce said comprised TV signal.

4. A system for transmitting a plurality of TV signals via a common transponder in accordance with claim 3 wherein said circuit means for processing said compressed signal includes: analog-to-digital converter means for sampling at a first rate each line of said compressed signal to generate a plurality of digital numbers each representative of the amplitude of said compressed signal at the sample time, memory means for storing said digital number at said first rate, read means for reading said digital numbers at a second rate to generate a digital data stream, and digital-to-analog circuit means responsive to said digital data stream to generate said reconstructed TV signal.

5. A system for transmitting a plurality of TV signals via a common transponder in accordance with claim 4 wherein said compressed TV signal comprises N lines and said reconstructed TV signal comprises 2N lines.

6. A system for transmitting a plurality of TV signals via a common transponder in accordance with claim 5 wherein the ($N^{th}$) and ($N^{th}+1$) lines of said reconstructed TV image are substantially identical.

7. A system for transmitting a plurality of TV signals via a common transponder in accordance with claim 6 wherein each of said plurality of TV signals originate at a different geographical location.

8. A system for transmitting a plurality of TV signals via a common transponder in accordance with claim 7 wherein each of said plurality of TV signals are transmitted to said transponder via individual transmitting stations with each of said transmitting stations being located at different geographical locations.

9. A method for transmitting and receiving a plurality of TV signals, comprising the steps of:
   (a) deleting selected lines of each of said TV signals to be transmitted;

(b) expanding the remaining lines of each of said TV signals to produce a plurality compressed signals with the time interval of each line of said compressed signal being equal to the time interval by a plurality of lines of said TV signal;

(c) modulating a plurality of carriers with said compressed signals to produce a plurality of modulated carriers;

(d) simultaneously transmitting said plurality of modulated carriers to a plurality of receivers via a common transponder to a plurality of receiving stations to which each of said modulated carriers are demodulated to recover said plurality of compressed signals;

(e) processing each of said plurality of compressed signals to produce a reconstructed TV image by storing lines of said compressed signal in real time, reading said stored compressed signal at a higher rate to produce a reconstructed line having a duration less than the time interval by a line of said compressed signal and repeating said reconstructed line, as necessary, to produce a reconstructed TV signal having a standard format.

* * * * *